INVENTORS
WALTER HOPPE
ERWIN SCHLATTER

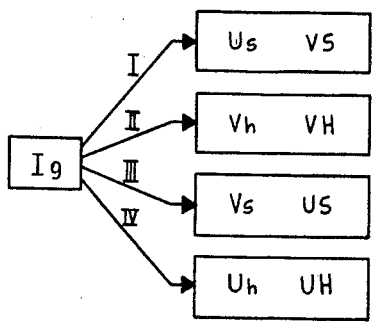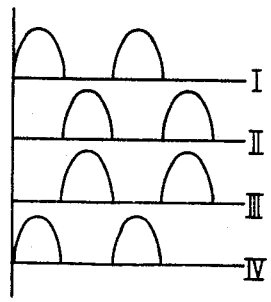
Fig. 1a  Fig. 1b
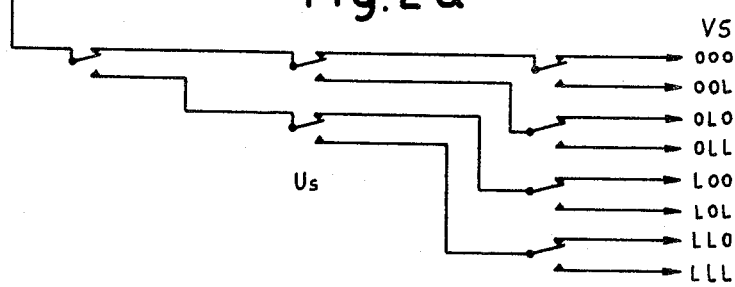
Fig. 2a
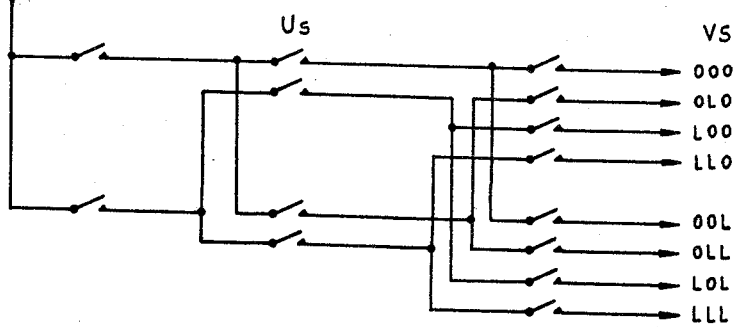
Fig. 2b
INVENTORS
WALTER HOPPE
ERWIN SCHLATTER INVENTORS
WALTER HOPPE
ERWIN SCHLATTER
By

INVENTORS
WALTER HOPPE
ERWIN SCHLATTER

United States Patent Office 3,176,197
Patented Mar. 30, 1965

3,176,197
DEVICES FOR TESTING THE CARRYING OUT OF SWITCHING OPERATIONS IN SYNCHRONISED RELAY GROUPS
Walter Hoppe, Munich, Germany, and Erwin Schlatter, Oberglatt, Zurich, Switzerland, assignors to El-Re-Ma S.A. per lo sfruttamento di brevetti, Lugano (Tessin, Switzerland), a corporation of Switzerland
Filed Sept. 29, 1961, Ser. No. 141,674
3 Claims. (Cl. 317—157)

Series of successive switching operations in relay groups, which are carried out in such a manner, that a switching depends on the position of the previously switched in relay eventually also in combination with mechanical or electronic switches, are met with in nearly all appliances of signal technology (automatic calculators, telephone installations, automatic controls and so forth). Two possibilities are known of operating these further switching relay groups:

(1) Unsynchronised switches, wherein the switched in relay contact determines the time point of the next relay switching.

(2) Synchronised switchings, wherein the relays are driven by impulses from a separate impulse generator.

In practice, the latter switch technique becomes more prominent, as it has the advantage that the relay contacts can be switched at zero-current point.

Both switching methods have a drawback which is particularly important in connection with long switching series and/or large relay groups. As a switching always depends on the preceding switching, an occurring error of a relay causes a faulty course of the whole switching series (in connection with calculating machines, for example a faulty calculation). When the probability of an accidental relay error es equal to $w$ there is usually the probability that in relay groups with $n$ relays an error occurs during $m$ switching operations, equal to $nmw$. When also $w$ is very small with good relay constructions, the product $nmw$ in large groups and long switching series may however assume disturbing values.

The present invention has for its object to avoid an error probability accumulation in synchronised relay arrangement, the switching position of which depends on the result of preceding switching operations carried out in relay groups.

In some relay calculating machines circuits have been developed, in which the occurrence of an incorrect calculating result is discovered and corrected and which therefore in their particular case lead to similar results, like the invention. In one case, the machine operates in binary coded decimal system, requires three additional relays for each tetrade and operates according to a particular mathematical system, which is only applicable for this type of calculating machine. In other cases there is provided a biquinary calculating machine, in which there is provided by additional contacts on the relays to test whether one and only one relay is closed or not in a binary and a quinary relay unit; if this requirement is not fulfilled, the calculating operation is interrupted because it may be false or it can again be started from any intermediate result, in the hope that a repitition will lead to a correct result. This circuit also cannot be referred to as a correcting circuit in the sense of the invention as it does not respond directly to the essential accidental error of a relay, namely on the contact disturbance, which occurs when a small particle of dirt or an oxide or sulphide film is located between the contacts, as in this case a relay is in the switched in condition, the error testing does not indicate any disturbance; in spite of this the circuit is disturbed and leads to defective results. In the case of the calculating machine referred to, an error of this character will be discovered during the further course of the calculation, as in a binary or quinary relay group of the next calculating operation, all the relays remain in the rest position; however, this method of subsequent contact error testing is restricted to relay calculating machines in the biquinary or an associated mathematical system.

This invention relates to a device for testing the carrying out of switching operations in synchronised relay groups energized by an impulse generator and for the correction of defective switching operations.

The device according to the invention has the advantage of responding directly to the electrical condition of the relay, particularly contact errors, requires few switching means, no special testing contacts in the relays, and can be used in the most diverse synchronised relay circuits. It is characterised in that it is provided with control elements which are responsive to at least a successful carrying out of a switching and are so switched in that switching on can only occur at fixed values of the said electrical magnitude, whilst in the case of values departing from this magnitude these control elements produce the setting in operation of a correcting device, in such a manner that the contact position of the undisturbed group is maintained, the effective contact position of the disturbed group is reversed, the relay switch, which has led to the disturbed contact position, is repeated and the said electrical magnitude is again examined by the control elements of the impulse generator, in such a manner that this correcting switch cycle is so often repeated until the tested electrical magnitude has the fixed values, whereupon the control elements release the relay switching to be carried out. The said tested electrical magnitude in a relay circuit may, for example, be its total electrical resistance or a current obtained by a drop in voltage caused by its resistance or a current obtained by the application of a measuring voltage. The electrical magnitudes will now vary generally when one of the relays of the group is disturbed. By suitable arrangement of the relay groups it is possible to obtain that these modifications are particularly large. Very often it is possible to obtain the result that all the contacts of a relay circuit through which current passes are in series (with or without intermediate arranged relay windings). Then, either a mechanically or electrically non-closed contact causes the resistance of the circuit to be increased by many orders of magnitude over the blocking resistance of the contact.

The arrangement of the device will now be described in greater detail with reference to the accompanying drawings, wherein:

FIG. 1a shows the basic circuit of a relay system with synchronised relay groups.

FIG. 1b shows an impulse diagram for FIG. 1a.

FIG. 2a shows a binary relay pyramid with three binary positions.

FIG. 2b shows the same relay as FIG. 2a but shown with operating contact relays.

Figure 3:
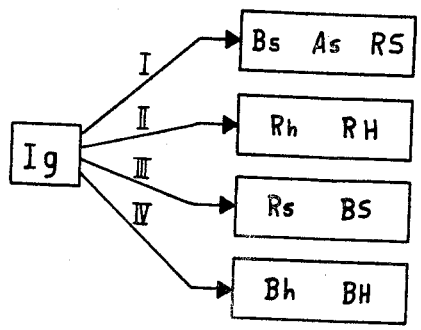
FIGURE 3 shows the block switch diagram of a relay calculating machine.

FIGURE 1a shows a known basic circuit of a relay having synchronized relay groups. Said circuit consists of two relay groups, which operate alternately and are indicated by U and V, respectively. The control windings VS of relay group V are connected to control contacts Us of the relays of group U and control windings US of the relays of group U to control contacts Vs of group V. The relays of groups U and V are also provided with holding windings UH and VH, which are connected to holding contacts Uh and Vh. The switching cycle is carried out by impulse generator Ig, provided with branches I to IV, the impulse diagram thereof being shown in FIGURE 1b. The impulses are set "at interstice," that is to say that one relay group must have completed its operation before the next relay group has been switched on. As a normal result, the relays are never switched in under current. After the termination of the switching, the contact position is maintained or held by the energisation of the windings VH and UH respectively, so that the actuated relay contacts can become active during the next switching operation. The holding could also be effected mechanically so that no holding impulses would be necessary. For this purpose, there would be necessary certain switch operations, depending on the type of the relays, which must be carried out before carrying out a fresh switch operation and which have to release or clear the old switch positions. A switch operation is therefore, in the case of mechanically held relays, composed of the clearing and the actual switch operations. The invention is thus applicable without modification also in circuits with mechanically held relays, when this combined switch operation is understood under the name "switch operation." As the holding operations are omitted, the holding circuits can be omitted in the forms of construction.

The structure of the relay groups depends on the switch problems associated therewith; it is, however, also determined by the requirement of as large as possible differences of a tested electrical magnitude, which is necessary for switching and which is to be tested by the control element of the impulse generator, for example the electrical resistance of the relay group circuit. The greatest resistance difference is obtained when all the contacts of the group are connected in series, as then a contact interruption increases the resistance of the circuit on the blocking resistance of the disturbed contact. There are some relay group switches in which this requirement is fulfilled without modifications.

FIG. 2a shows, for example, the known binary relay pyramids (shown with three binary positions). Each binary position contains relays, of which, in FIG. 2a only the contacts are shown. The contacts in FIG. 2a are arranged one behind the other; a contact error makes the resistance of the switch equal to the blocking resistance of the disturbed contact. It is possible, with outlets indicated by binary numbers to lead to relay windings of the group V. Relay pyramid arrangements in several denomination rows have a large number of multiple contact relays, so that the arrangement according to the invention is very advantageous.

In FIG. 1a, a relay may be disturbed in the rest, as also in the operative, contact position. Therefore, it is not possible in the circuit of FIG. 2a fundamentally to know whether the relay has mechanically reversed correctly. In this respect, the device of this invention behaves exactly reversely to the error testing device of biquinary relay machines of Vibbard, referred to in the introduction, in which a mechanical non-functioning of a relay, but not a contact disturbance, can be recognised directly. Provided there is a good relay construction and a sufficient attraction security, only contact disturbance may occur, but no accidental disturbance in the magnetic circuit, so that the last mentioned test is of minor importance. In some cases, this testing method may be applied, namely when circuits with make-and-break contacts are replaced by circuits with working contacts. In general, such a modification makes it necessary to increase the number of elements in the circuit. In FIG. 2b is shown the same relay pyramid as in FIG. 2a but with operating contacts. In the circuit in FIG. 2b, the number of relays is doubled, but it is always necessary either for a relay in the upper or lower groups to be closed and undisturbed in making contact. It will at once be seen that—in contrast to FIG. 2a—not only one contact error, but also a falsely unattracted relay leads to resistance variation and can therefore be noticed.

FIGURE 3 shows a block diagram of a known relay calculating machine. As is readily apparent, FIGURE 3 differs from FIGURE 1 by the fitting of the four branches of the impulse generator with special relay calculating aggregates, while, instead of the usual single groups of contacts in cooperative arrangement with branch I of the impulse generator, two groups of contacts As and Bs are utilized, said groups corresponding with the two operations involved in a calculation. In this calculating machine the decimal denomination rows, to allow ten transfers, are arranged in series, while, for reasons of construction, only operating contact relays were used. The device of this invention therefore can be used easily in the relay aggregates and makes it possible to note mechanical switch errors of the relays; a non-switching operating contact interrupts in the same manner the electric circuit like a switching, but with a relay disturbed in contact, and can therefore be corrected.

The make-and-break contacts of the relay pyramids in FIG. 2a are relay contacts of the group U(=Us); the corresponding relays (windings US) must anyhow be controlled by contacts of the other relay group V(=Vs). The method of this control depends on the particular problem. The relays, of which the contacts in FIG. 2a belong, thus form a binary relay register.

It is usual, in such a relay register, to switch the relay windings US parallel, as the relay to be switched may be of any number (it is determined by the number of ones of the binary number to be inserted). In the parallel-wise switching method, a freshly switched-in relay does not in any known way influence the feeding of another relay.

Figure 4A:
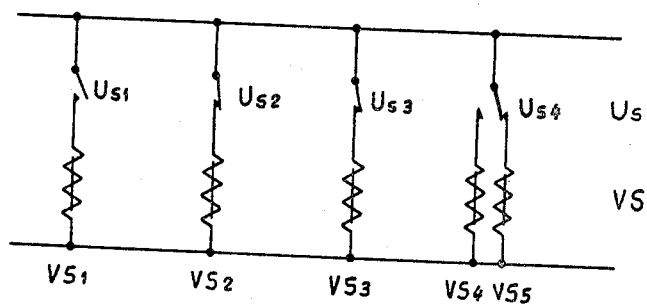
FIG. 4a shows an example of a general relay circuit having operating contacts, rest contacts and make-and-break contacts.

Parallel switching is, however, not favourable for the arrangement according to the invention, as the resistances and the currents of the circuit vary the less with a contact disturbance, the more branches are switched in parallel. With a great material provision, it may be applied, if the separate branches are tested separately. It is, however, mostly simpler to transform the parallel aggregates into a series aggregate. FIG. 4a shows a typical relay parallel circuit. Contacts (Us) and windings (VS) belong, as usual, to various groups. Their position is just determined by a preceding relay switching, for example, the operating contact $Us_2$ and the switching contact $Us_4$ have been closed, so that the relay switching is defined by energization of winding $VS_2$, winding $VS_3$ (by reason of the non-actuated and therefore current-conducting rest contact $Us_5$) and winding $VS_5$.

Figure 4B:
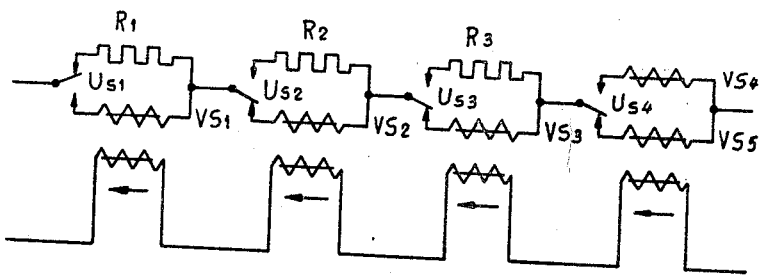
FIG. 4b shows a similar circuit as in FIG. 4a but in a series circuit arrangement.

It is difficult to find a disturbance of $Us_2$, as on the one hand the resistance or current variation is only slight in the circuit to be traversed and, on the other hand, even with correct switching, the number of relays to be switched in, and thus also its electrical magnitudes, constantly vary irregularly. FIG. 4b now shows the same group in a series circuit. By replacement of the operating contacts $Us_1$, $Us_2$ and the rest contact $Us_3$, by reversing contacts by introducing ohmic resistances $R_1$, $R_2$, $R_3$ equal to the corresponding relay winding resistances, there is formed a symmetrical circuit, in which the resistance is independent of the number of actuated relays, and on the occurrence of a contact error, rises on the blocking resistance of the disturbed contact. The circuit of FIG. 4b thus shows the same features as the previously discussed circuits and is therefore advantageously suitable for the use of the arrangement according to the invention. It should be mentioned that circuits of the type of FIGURE 4, similar to the circuits of the type of FIG. 2a, permit of no testing of the mechanical circuit of the relays.

Figure 5:
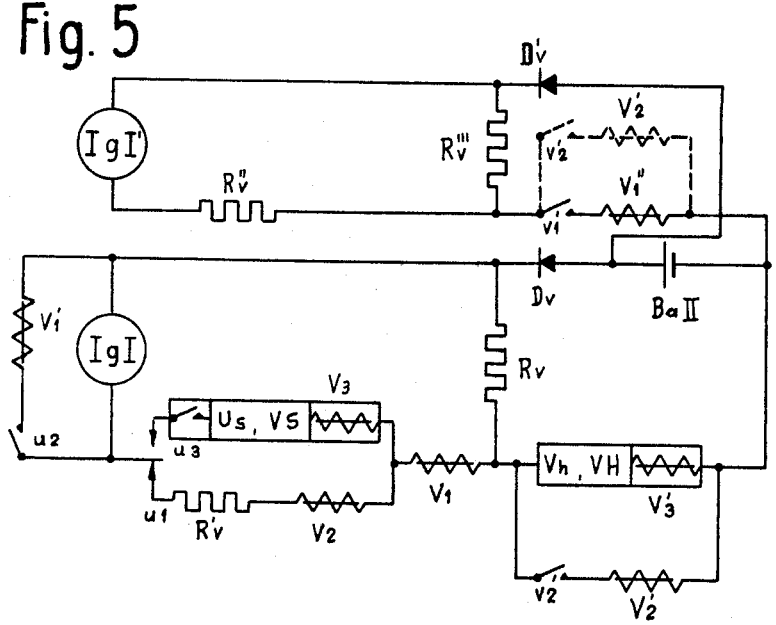
FIGS. 5 and 5a show one embodiment of the invention for purely operating contact switches.
Figure 5A:
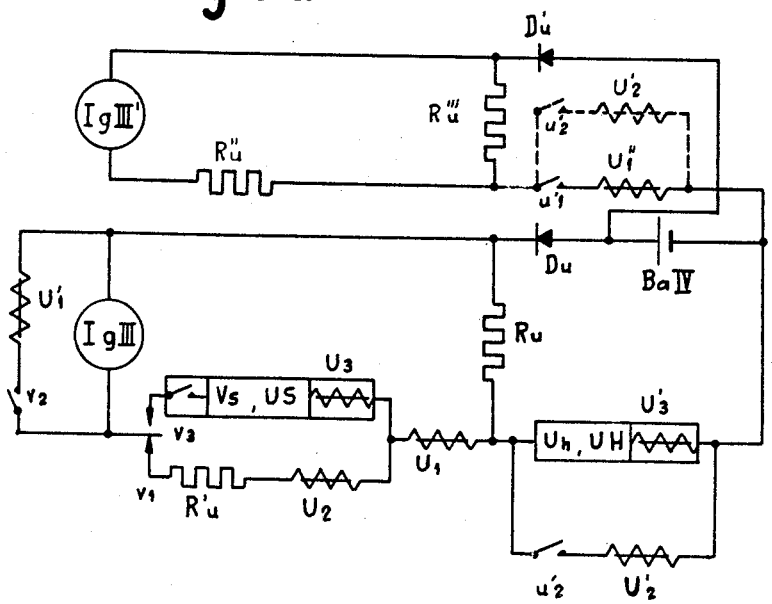
Figure 6A:
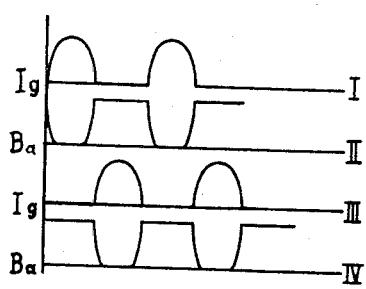
FIG. 6a shows the impulses diagram of this circuit with no disturbance.

FIGS. 5 and 5a show an example of construction of the arrangement according to the invention for purely operating contact circuits of relay calculating machines. The circuit is built up symmetrically, that is to say the two synchronised operating relay groups are controlled and actuated in exactly the same way. Two impulse generators $I_gI$ and $I_gIII$ transmit the control impulses. In the simplest manner they are each formed by a half-wave rectifier in series with a source of alternating current. FIG. 1b and FIG. 6a show these cut up direct currents forming control impulse in branches I–III.

The relay groups, in which the arrangement described is applied, are indicated by $Us$, VS and $Vs$, US respectively. A diode circuit is provided for testing the electrical magnitude of the relay groups in this form of construction, said circuit being responsive to the resistance variations of the relay groups $Us$, VS and $Vs$, US respectively. This circuit is illustrated in simpler form in FIG. 7 for the better illustration of the method of operation. When the impulse transmitter $I_gI$ transmits an impulse through $Us$, VS, a voltage appears in the resistance RV opposite the direct voltage of the current source BaII and provides, by reason of the diode $Dv$, that no current can flow in the holding circuit $Vh$, VH. The relays of the group V thus released can therefore be switched by the control impulse of the impulse generator $I_gI$. When the control impulse has terminated, the bias voltage of the diode $Dv$ is removed and the current of the direct current source BaII can flow through the holding circuit $Vh$, VH and maintain the contact position of the group V. FIG. 6a shows clearly the complementary structure of the holding current (in the branches II and IV), which is equal to zero during the control impulses. A comparison of FIG. 6a and FIG. 1b shows that the impulse diagrams are identical, except the unimportant modification of the shape of the holding impulses. If now in FIG. 7 a contact is disturbed in $Us$, VS, no control impulse current can flow by reason of the blocking resistance of the disturbed contact. The resistance $Rv$, which now becomes effective as control element of the impulse generator for testing the resistance of the relay group circuit $Us$, VS is not traversed by the control impulse current and now sets in the first operation of the correcting switch circuit. This consists in the non-releasing of the-non-disturbed-contact position $Vs$ in the group V. As the diode $Dv$ does not receive an inverse voltage, the current of the branch II is not interrupted. This holding of the last correct contact position on the occurrence of a contact error is of fundamental importance for the method of operation of the invention. It now permits of the reversal of the effective contact position of the disturbed relays, as also the repetition of the disturbed relay operation in the further course of the correcting switch cycle. This control can now take place in various ways.

FIGS. 5 and 5a show a form of construction of the control which is applicable in working contact relays in $Us$, VS, or $Vs$, US, in which the reversal of the disturbed relays resides in a switching off of all the relays of the group. In FIGS. 5 and 5a the control impulse can be conducted through the make-and-break contacts $u_1$ and $v_1$ respectively, either through $Us$, VS or $Vs$, US or even through resistances $Rv'$ or $Ru'$. In the undisturbed course the contacts $u_1$ and $v_1$ are so switched round that they conduct the current through $Us$, VS or $Vs$, US, as windings of the corresponding relays $U_1$, $U_1''$ or $V_1$, $V_1''$ are always traversed by control impulses or holding impulses. For feeding the holding currents in $U_1''$ or $V_1''$ a particular holding current impulse circuit is provided, of which the holding impulses do not depend thereon, whether a control impulse flows through the resistance $Rv$. This circuit operates through the impulse generator $I_gI'$ arranged parallel to $I_gI$ and delivering similar impulses as said latter, which through the resistances $Rv''$, $Rv'''$ and the diode $Dv'$ so controls the direct current of the source BaII, that current impulses of the same form become active in the holding winding $V_1''$ (or $U_1''$) become active as in the holding circuits of the relay groups (that is to say in $Vh$, VH or in $Uh$, UH). As the shape of the holding impulses in $V_1''$ or $U''$ is not essential for the discovered arrangement and as these holding impulses do not depend on the result of an error test, the combination of $I_gI'$ with $Rv''$, $Rv'''$, $Dv'$ and BaII may also be replaced by any other holding current impulse generator which is suitable for sending out impulses of the branch II (or, by replacement of $I_gIII$, $Ru''$, $Ru'''$ $Du$ and $BaIV$ of the branch IV) of FIG. 1b or from FIG. 6a. Also the working contacts $u_3$ and $v_3$ are permanently closed during the normal switching course, as the corresponding windings $V_3$ and $V_3$ or $U_3$ or $U_3$ and $U_3'$ are continuously traversed by controlling or holding impulses.

Figure 7:
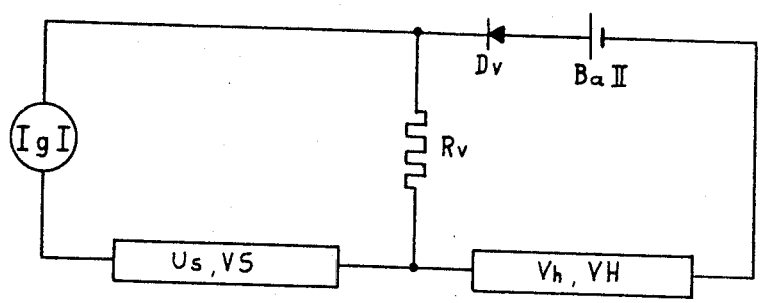
FIG. 7 shows the fundamental testing circuit of FIGS. 5 and 5a through a biased diode.
Figure 7:

In the case of undisturbed operation,, the circuits in FIGS. 5 and 5a are fully analogous to the circuit of FIG. 7 as the contacts $u$ and $v_1$ are so switched that they conduct the control impulses on to the closed contacts $u_3$ or $v_3$.

The importance of these latter contacts $u_3$, $v_3$ (and of the windings $V_3$, $V_3$ and $U_3$, $U_3'$) is hereinafter explained. These contacts are arranged in series with the relay group circuits to be tested and belong to the relays which differ from the relays of the group switching by a particularly high switching speed (about 1 millisecond); they have to allow the device to become active even in the case of contact disturbance in the holding circuit. If, for example, a holding circuit is disturbed, but the control circuit is not disturbed, the control impulse, which should occur simultaneously with the disturbed holding impulse, can first flow, but as the contacts by reason of the contact disturbance in the holding circuit are not held, they release during the control impulse, whereupon the interruption of the control impulse can introduce in the usual manner the correcting switch cycle. It is now desirable that this interruption should take place as soon as possible after the beginning of the control impulse. In this manner a current-loaded switching off of relay contacts in the middle of the control impulse, is avoided; also the danger of a partial release of the undisturbed relay group (which may occur, when the control impulse can only partly flow) is avoided. The use of a rapid switch relay with the windings $V_3$, $V_3'$ or $U_3$, $U_3'$ in each of the synchronised relay groups now displaces this switching off at the beginning of the control impulse: If, for example, the holding circuit $Uh$, UH is disturbed, $U_3$, by reason of currentless state of $U_3'$ drop already at the beginning of the current impulses of the impulse generator $I_gI$. Consequently the arrangement will become exactly equally effective, as though the control impulse circuit had been disturbed through $Vh$, VH; that is to say the undisturbed contact position $Vs$ maintained by the holding current in $Vh$, VH is further maintained and the correcting cycle can commence.

Figure 6B:
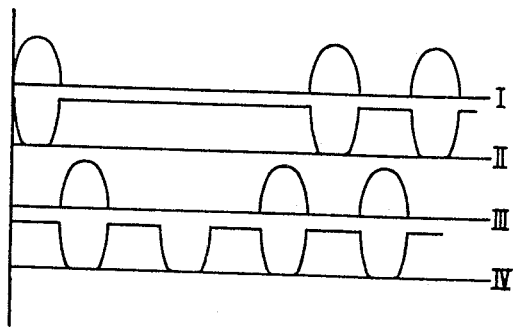
FIG. 6b shows the impulse diagram of this circuit with a correction switching cycle.

This cycle will now be described for the above-mentioned case of an opening contact in $Us$, VS, whereby it is immaterial, whether this contact as just described occurs as an opening of the relay contact $u_3$ or whether it deals with a disturbed control contact $Us$. The non-flowing control impulse of $I_gI$ effects that also the relay winding $V_1$ receives no current. As now the holding winding of this relay $V_1$ is energized by BaII through an own holding impulse generator controlled by $I_gI'$ (which is not contact-controlled and therefore always supplies the normal diagram of the branch II in FIG. 6a) the make-and-break contact $v_1$ drops into its rest position. Simultaneously, however, the holding current in V$h$, VH continues to flow, so that the diode D$v$ receives no inverse voltage, so that the undisturbed contact position V$s$ remains maintained. By reason of reversed closing of contact $v_1$, the next control impulse of the impulse generator I$g$III passes through the resistance R$u'$, which is approximately equal to the relay circuit resistance, and the relay winding U$_2$. This control impulse produces a voltage drop across R$u$, which acts as an inverse voltage on the diode, so that a holding impulse pause occurs in V$h$, UH which allows all the working contacts U$s$ to drop. As by reason of $v_1$ no control impulse was fed to the windings US, no winding U$s$ can attract again. Thus the effective contact position U$s$ is reversed; as then all the relay contacts U$s$ pass into the rest position, all effective, that is closed, operative contacts U$s$ (and also the disturbed contact) reverse their position. The attracted relay U$_2$ is maintained during the next control impulse of I$g$I through a holding circuit $u_2'$, U$_2'$, which for example, as in the drawing, can be placed parallel to U$h$, UH, but which can also be placed parallel to $u_1'$, U$_1''$ (indicated in broken lines). This control impulse cannot flow through U$s$, V$s$ as now all the operative contacts have been opened. On the contrary, the closed contact $u_2$ permits a current across the relay winding V$_1'$ which leads to an attraction of this relay. This control impulse current does not pass through the resistance R$v$, so that the diode D$v$ also in this switching phase, does not receive any bias-voltage, so that with the holding of the undisturbed contacts V$h$, VH is further maintained. The holding current through $v_1'$, V$_1''$ maintains the contact $v_1$ in the operating position during the next impulse of I$g$III, so that now the impulse current flows in through the contacts V$s$ into US and the relay circuit, which has led to the disturbed contact position, is repeated. All the open operative contacts, that is to say also the previously disturbed contact, are closed. The next impulse of I$g$I now endeavours to again pass through U$s$, V$s$. When the disturbance has been eliminated (for example a dust particle between the contacts removed), the switch operation series continues normally; if the disturbance is still present, the cycle just described is repeated. As this correcting cycle can be repeated often, there is a great probability that the disturbed relay again becomes operative. FIG. 6b shows the impulse diagram, which is obtained when the correcting switch cycle is carried out once again. It shows the described failure of two control impulses in the branch I and the prolonged holding impulse in circuit II, which permits of the contact positioning of the undisturbed group during the course of the correcting switch cycle.

This specification shows that the correcting switch cycle consists of a single small relay program which is superposed on the actual switch program of the synchronised relay groups. For carrying out this program, it is naturally possible in the sense of the invention to use also other suitable relay circuits. Thus, for example, it is possible to so arrange the program that the errors or disturbance are recorded or counted. It is possible, for example with the undisturbed program to allow relay counters or even other counters to operate and to register a distorted operation, the number of correction cycles and so forth. When, under all circumstances, correct switch operations of a synchronised relay group are of substantial importance, as for example in the case of some automatic controls, of which the failure may be very dangerous or have costly consequences, it is very easy, according to a further idea of the invention, to rely upon a parallel arranged reserve relay group, when the correction cycle has not led to the final object, for example, when a relay is not accidentally disturbed, but is defective.

For this purpose, there is allowed to determine by a relay counter or a time relay the end of an unsuccessful series of correcting switch cycles and then jumping over relay contacts similar to $u_1$, $v_1$ into new relay groups, which take over the problem of the disturbed relay group. It is naturally possible to combine with the finish of a given series of correcting switch cycles also error indicating appliances, warning appliances and so forth.

In the correcting switch cycle a distorted relay circuit must be reversed, whereupon the same circuit is repeated which has led to the distorted switching. The reversal of a distorted contact position is very simple, when all the relays only contain operating contacts. It is then only necessary to switch off the holding current of the disturbed group; then all the relays return to their rest positions, that is to say also the contact distorted relay. On the other hand, the holding current of the relay group which has not been disturbed must not be switched off as the preceding relay circuit, which has led to the disturbed contact position, must be repeated with the expectation that the contact position, eventually only after numerous repetitions of the same correcting switch cycle, will no longer indicate a disturbance. When not only operating contacts, but also rest and make-and-break contacts are present in a relay group circuit (as for example in FIG. 2a and in FIG. 4b), a simple switching off of the holding impulses of the disturbed group is no longer sufficient. Indeed, the disturbed switch operation may occur during the falling back of a relay into its rest position, when a rest contact (or the rest position of a switch contact) is disturbed. A reversal of the contact position in the relay switching carried out but disturbed then consists in an attraction and not in a drop in the corresponding relay. Means must therefore be present which enable this reversal of the contact positions to be carried out. FIG. 4b shows an arrangement of these circuits, which simply consists of counterwindings which are wound around all the relays of the relay group and are traversed by the current altogether. If now a relay position is disturbed, the same relay circuit is repeated, as that which led to the disturbed position, whilst, however, these counterwindings are simultaneously traversed by the current. However, as a result, there occurs a complementary switching in this relay group, and the relays change their position. Hereupon, there is repeated, exactly as in circuits with purely operating contact relays, the circuit which has led to the disturbed contact position (without switching in the counterwinding) whereupon the relays again assume the old position.

Figure 4B:
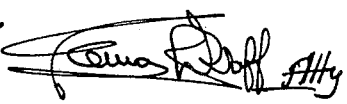
Figure 8:
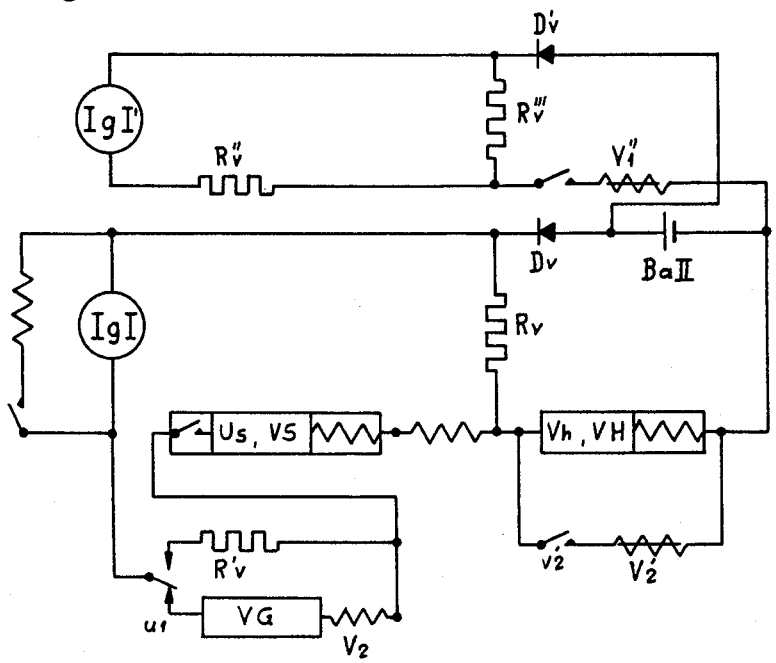
FIG. 8 shows the same embodiment as FIGS. 5 and 5a but modified for suitable operating contact, rest contact and make-and-break contact circuits.

When the synchronised relay groups to be switched in are also provided with make-and-break and rest contacts, in addition to the operating contacts, the correcting switch cycle may be carried out with a slightly modified circuit according to FIGS. 5 and 5a. FIG. 8 shows this modified circuit in only one group, as the other group is constructed entirely symmetrical. The difference resides therein that the counterwinding series (VG in FIG. 8) described with reference to FIG. 4, are connected in relay groups U$s$, VS (V$s$, US respectively) when a reversal of the contacts in the correcting switch cycle is to occur. In FIGS. 5 and 5a, this reversal consisted in a simple switching off the relay groups. In the undisturbed course, the reversing contact $u_1$ always switches the resistance R$v'$, which only possesses the function of maintaining constant the relay group resistance. The course of the correction switch cycle is analogous to the course already described, with the exception of the difference that the contact $u_1$ (or $v_1$) in the rest position does not switch over from the relay group to a resistance R$v'$ (or R$u'$), which would cause all the effective operating contact positions of the relay group to fall back into their rest position because the lack of current in US or VS, but from the resistance R$v'$ (for example R$u'$) on the counterwindings of the relay group VG (or UG). The relay group therefore does not fall into the currentless condition but, by reason of the common action of the counterwindings and the impulse through U$s$, VS, changes the position of all the contacts. During the next control impulse of the same impulse generator, this counterwinding is again switched off, so that the relay switch, which has led to the disturbed contact position, is normally repeated, whereby naturally the contacts must again spring back. Succeeding correcting switch cycles thus lead to the permanent switching over in accordance with the invention of the contacts of the relay group.

We claim:

1. In an electrical circuit having, in combination, at least two synchronized groups of relays actuated by current impulses, an impulse generator for feeding each of said relay groups with control impulses, contacts in each of said relay groups, switch means actuated by control impulse current passing through at least one relay winding of one group of relays and a contact of another group of relays for controlling the flow of direct current; means for both testing the carrying out of switching operations in said synchronized relay group fed by its said impulse generator and correcting any defective switching operations, said testing and correcting means including a signal means for indicating the correct switching operation, means electrically associated with said signal means for correcting defective switching operations, control element means for testing the signal from said signal means, said control element means being electrically associated with said means for correcting defective switching operations and said signal means and said impulse generators, said control element means being so electrically associated in such a manner that switching on occurs only at predetermined fixed values of the electrical signal of said signal means and that said correcting means operate to correct defective switching operations when said values are different from said fixed values.

2. The electrical circuit of claim 1 wherein said signal means includes the electrical resistance of the circuits of said relay groups.

3. The electrical circuit of claim 2 wherein said contacts of each of said relay groups are in series.

References Cited by the Examiner
UNITED STATES PATENTS

| | | | |
|---|---|---|---|
| 2,586,999 | 2/52 | Schwartz | 324—28 |
| 2,833,983 | 5/58 | Shaw | 324—28 |
| 2,852,736 | 9/58 | Spahn | 324—28 |
| 2,901,675 | 8/59 | Homan | 317—140 |

SAMUEL BERNSTEIN, *Primary Examiner.*